(12) United States Patent
Tobe et al.

(10) Patent No.: US 7,292,860 B2
(45) Date of Patent: *Nov. 6, 2007

(54) CELL FORMATION CONTROL METHOD, A MOBILE COMMUNICATIONS SYSTEM, AND A BASE STATION AND A MOBILE STATION USED THEREIN

(75) Inventors: Hideki Tobe, Yokosuka (JP); Hijin Sato, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/395,339

(22) Filed: Apr. 3, 2006

(65) Prior Publication Data

US 2006/0172731 A1    Aug. 3, 2006

Related U.S. Application Data

(63) Continuation of application No. 10/237,697, filed on Sep. 10, 2002, now Pat. No. 7,110,769.

(30) Foreign Application Priority Data

Sep. 10, 2001    (JP)    ............................. 2001-274214

(51) Int. Cl.
    *H04Q 7/20*    (2006.01)
(52) U.S. Cl. .................. 455/446; 455/450; 455/447
(58) Field of Classification Search ............ 455/446, 455/450, 447, 436, 437, 422.1, 453, 522
    See application file for complete search history.

(56) References Cited

U.S. PATENT DOCUMENTS

| | | | |
|---|---|---|---|
| 5,499,395 A | | 3/1996 | Doi et al. |
| 5,504,938 A | * | 4/1996 | Redden ........................ 455/436 |
| 5,815,813 A | | 9/1998 | Faruque |
| 5,898,682 A | * | 4/1999 | Kanai ........................... 455/522 |
| 5,987,011 A | * | 11/1999 | Toh ............................. 455/450 |
| 6,038,444 A | * | 3/2000 | Schipper et al. ............. 455/421 |
| 6,169,887 B1 | * | 1/2001 | Cordell et al. ............ 455/242.2 |
| 6,178,328 B1 | | 1/2001 | Tang et al. |

(Continued)

FOREIGN PATENT DOCUMENTS

JP    64-68138    3/1989

(Continued)

*Primary Examiner*—Joseph Feild
*Assistant Examiner*—Huy Nguyen
(74) *Attorney, Agent, or Firm*—Oblon, Spivak, McClelland, Maier & Neustadt, P.C.

(57) ABSTRACT

When a base station of a mobile communications system attempts to reduce its cell radius for power saving, frequency re-use enhancement and the like, a risk is that an ongoing communication between a mobile station served by the base station may be disconnected, which is avoided by: the base station transmitting information about a new cell radius to mobile stations in the current cell; the mobile stations responding to the base station with a positive or a negative reply determined from the information received from the base station; the base station suspending or revising the attempted cell radius reduction according to the responses from the mobile stations; and further by the mobile stations being capable of performing hand-over more efficiently than ever owing to abilities to detect final cell radii of adjacent base stations.

8 Claims, 16 Drawing Sheets

U.S. PATENT DOCUMENTS

| | | |
|---|---|---|
| 6,198,930 B1 | 3/2001 | Schipper |
| 6,233,449 B1 * | 5/2001 | Glitho et al. .............. 455/423 |
| 6,522,885 B1 | 2/2003 | Tang et al. |
| 6,608,823 B1 | 8/2003 | Kato |
| 7,054,635 B1 * | 5/2006 | Ritzen et al. .............. 455/444 |

FOREIGN PATENT DOCUMENTS

| | | |
|---|---|---|
| JP | 5-259967 | 10/1993 |
| JP | 7-177567 | 7/1995 |
| JP | 9-163435 | 6/1997 |
| JP | 10-13908 | 1/1998 |
| JP | 10-108245 | 4/1998 |
| JP | 10-117166 | 5/1998 |
| JP | 10-327459 | 12/1998 |
| JP | 10-336104 | 12/1998 |
| WO | WO97/08909 | 3/1997 |
| WO | WO 00/18164 | 3/2000 |
| WO | WO 01/63960 A1 | 8/2001 |

* cited by examiner

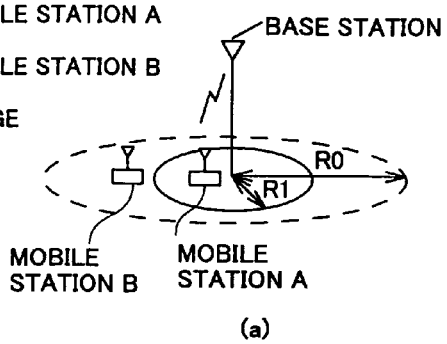
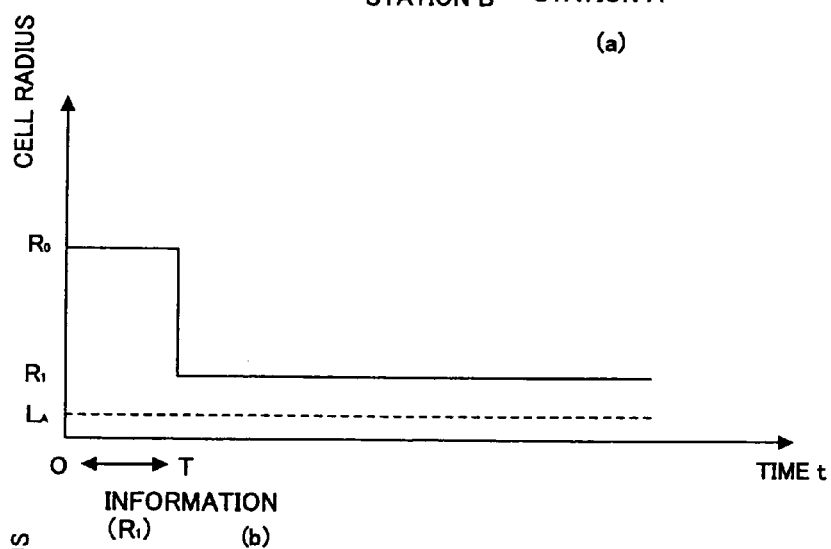
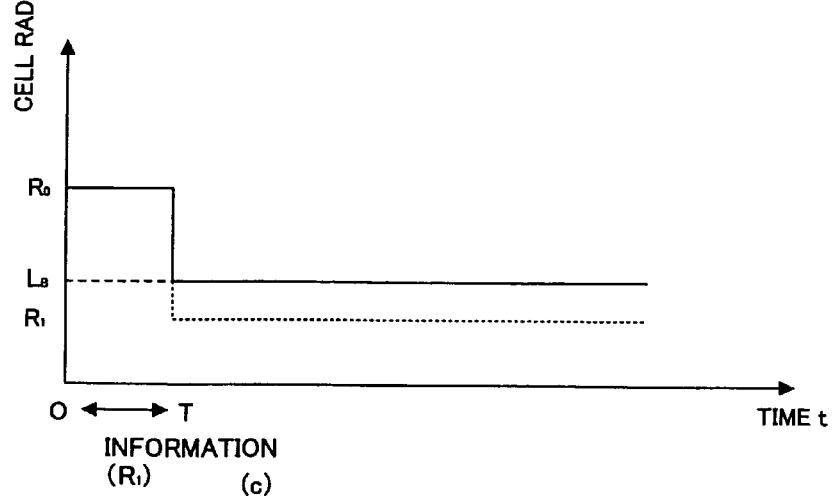

CELL FORMATION CONTROL METHOD, A MOBILE COMMUNICATIONS SYSTEM, AND A BASE STATION AND A MOBILE STATION USED THEREIN

CROSS-REFERENCE TO RELATED APPLICATIONS

This application is a continuation of U.S. patent application Ser. No. 10/237,697, filed Sep. 10, 2002, which is based upon and claims the benefit of priority from prior Japanese Patent Application No. 2001-274214, filed Sep. 10, 2001, the entire contents of each are incorporated herein by reference.

BACKGROUND OF THE INVENTION

1. Field of the Invention

The present invention generally relates to a control method of cell formation and a mobile communications system therewith, and specifically relates to the cell formation method and the mobile communications system therewith, wherein one or more mobile stations are served by a base station that is capable of changing and securing a service area of the mobile stations by changing the cell formation while communications are going on.

The present invention further relates to the base station and mobile station that can communicate according to the cell formation control method.

2. Description of the Related Art

An area where a base station can provide a communication service, i.e., a cell, depends on the quality of a control signal received by a mobile station, the control signal being for connecting the mobile station with the base station. When the base station serves a cell, a conventional method has been that transmission electric power of the control signal is predetermined, and the predetermined value is used. In recent years, an autonomous cell formation control method has been proposed, wherein a base station checks cell-formation of adjacent cells, and adjusts its cell formation such that areas not covered by the adjacent cells are efficiently covered. The autonomous cell formation control method mediates traffic congestion by controlling the cell formation according to a congestion state of the adjacent cells, and can raise frequency use efficiency. If the technology of such autonomous cell formation control is applied to a mobile communications system, a base station will be capable of changing cell formation, i.e., increasing and decreasing the radius of the cell, while communications are continuing.

When the cell radius is expanded, an increased number of base stations will become available to a mobile station that is in communication with a first base station. The communication connection to the first base station can be switched to a second base station, if the second base station is carrying a lower amount of traffic, such that a higher through put may be obtained.

On the other hand, when the cell radius of the first base station with which the mobile station is connected is reduced, it is necessary for the mobile station to switch the ongoing communication connection to another base station before the service of the first base station to the mobile station becomes unavailable.

However, according to the autonomous cell formation control of a conventional base station, a relief is not provided to the mobile station that would be made outside the service area of the base station before the base station actually reduces its service area.

For example, as shown in FIG. 16, when a base station 3 reduces its service area from an area indicated by a dotted line to an area indicated by a solid line, although a mobile station 3 served by the base station is thereby put outside the reduced service area of the base station 3, the mobile station 3 can be switched to the base station 2 by hand-over, such that the communication can continue. However, when a base station 1 reduces its service area from an area indicated by a dotted line to an area indicated by a solid line, there is no adjacent base station to perform hand-over for a mobile station 1 that is being served by the base station 1. Consequently, when the base station 1 reduces its service area, the mobile station 1 will be put outside the reduced service area, and the communication will be disconnected.

Thus, the conventional problem is that a normal communication of a mobile station with the first base station cannot be continued due to disconnection, a packet loss and the like, when the first base station reduces its cell radius, i.e., service area.

Even if there is the second base station available for the service to be continued in an adjacent area, hand-over has to be performed from the first base station to the second base station. Further, there is a possibility that the second base station may later reduce its service area. In this case, further hand-over is required from the second base station to a third base station, or back to the first base station, as the case may be.

SUMMARY OF THE INVENTION

It is a general object of the present invention to provide a method, a system using the method, and a base station and a mobile station that operate in the system, which substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the method, the system using the method, and the base station and the mobile station that operate in the system, which are particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides the method, the system, the base station and the mobile station that enable the system to function as summarized below.

The base station, serving a cell, is equipped with a facility to change formation of the cell, typically, the radius of the cell within which the service of the base station is available, and a facility to provide information about a contemplated cell radius change to one or more mobile stations in the cell. Each mobile station is capable of transmitting a request not to change the cell radius, and also capable of searching for another base station to which a hand-over is to take place, if the mobile station determines that the mobile station will be placed outside the cell if the cell radius change is actually performed by the base station. Then, the base station, upon receiving the request, is capable of suspending the contemplated cell radius change.

An extension to the above is that the mobile station is capable of calculating the distance between the base station and the mobile station, using signal strength of a signal from the base station, and other information, and the mobile station transmits information about the distance to the base station, such that the base station can adjust the cell radius enough to cover the mobile station concerned.

As an extension to the above, the base station is equipped with a facility to change the formation of the cell, i.e., the cell radius, gradually in stages until the contemplated cell radius change is finally reached, and a facility to inform the mobile stations about a next stage cell radius one by one at a predetermined interval. The mobile station is capable of transmitting the request not to change the cell radius when a cell radius change of any of the stages that is contemplated will place the mobile station outside the cell. This contributes to reducing processing load of the cell, because the number of control signals from the mobile stations to the base station in a given period of time is reduced, with transmission of the control signals being distributed over the stages.

A further extension to the above is that the base station is capable of transmitting information both about the next stage cell radius and about the cell radius in the final stage. In this case, the mobile station is informed of the final cell radius from the beginning, and is enabled to attempt a hand-over to a second base station if the final cell radius will not cover the mobile station, even if a cell radius of any prior stage may cover the mobile station. This alleviates frequency and traffic of the hand-over. Further, in this case, even if the second base station is in the process of a cell radius change, the mobile station can select a base station that will provide the most favorable communication conditions.

BRIEF DESCRIPTION OF THE DRAWINGS

FIG. 4A is a diagram of a a first embodiment of a cell radius changing process according to the present invention;

FIG. 4B is a graph of cell radius vs. time when only a mobile station A is present in a first cell radius;

FIG. 4C is a graph of cell radius vs. time when only a mobile station B is present in the first cell radius;

DESCRIPTION OF THE PREFERRED EMBODIMENTS

Hereafter, embodiments of the present invention are explained based on attached figures. A mobile communications system to which the cell formation control methods of the embodiments of the present invention are applied is structured as shown in FIG. 1.

Figure 1:
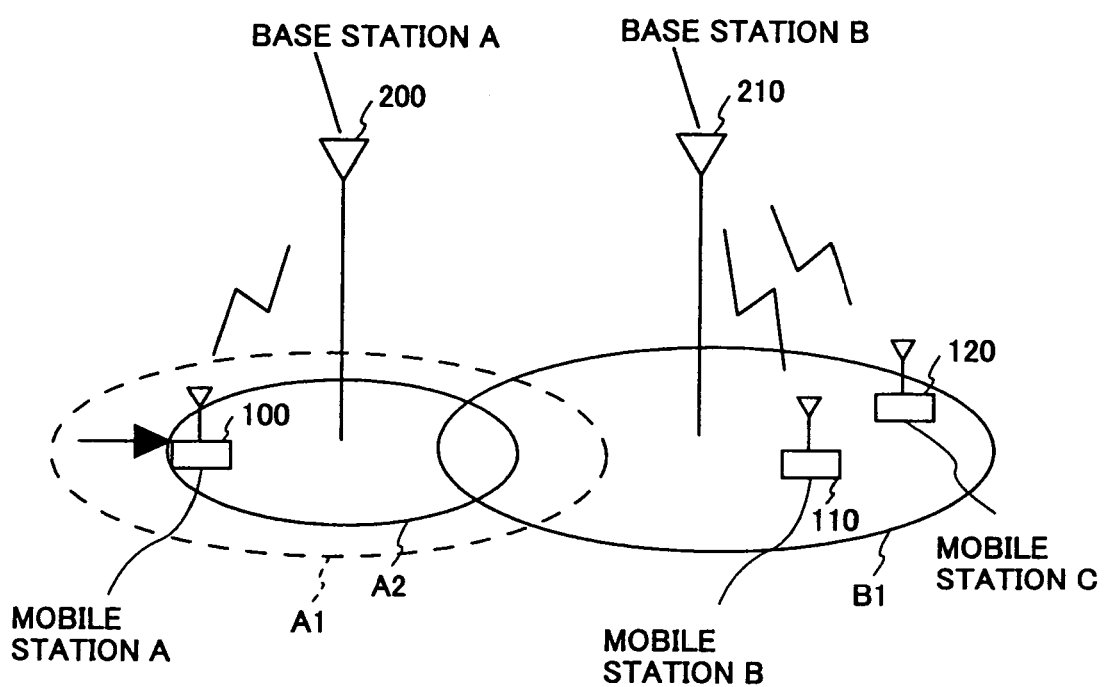
FIG. 1 is a figure showing an example of a structure of a mobile communications system to which a cell formation control method of an embodiment of the present invention is applied.

In FIG. 1, the mobile communications system is, for example, a PDC (Personal Digital Cellular) system, and includes a base station and two or more mobile stations. In this example, a mobile station A 100 is communicating with a base station A 200, and a mobile station B 110 and a mobile station C 120 are communicating with a base station B 210, and each base station is capable of changing cell formation. The cell formation is changed according to a cell formation change of an adjacent base station, a congestion situation, and the like. For example, the base station A 200 is capable of changing the cell formation from A1 to A2. The base station B 210 is also capable of changing its cell formation. A change of the cell formation can be realized by changing transmission electric power of a perch channel (a control channel used in order that a mobile station may synchronize with a base station), thereby a cell radius, i.e., the radius of a service area, is changed. Therefore, a change of transmission electric power is equivalent to a cell formation change. Further, the base station may use a sector antenna. In that case, a change of the transmission electric power of any of one, more than one, and all sectors is regarded as a cell formation change.

In the present invention, when the base station A 200, for example, carries out a cell formation change, i.e., a service area (=cell) change, e.g., from A1 to A2, it is carried out such that the mobile station A 100 does not come outside of the service area. According to the present invention, the base station performs the cell formation change based on a response from the mobile station that informs the base station whether or not the mobile station will be placed outside of the service area, thereby the base station can adjust the cell formation change such that the mobile station can remain inside the service area. Consequently, disconnection of communication of the mobile station, due to the cell formation change, can be prevented.

Figure 2:
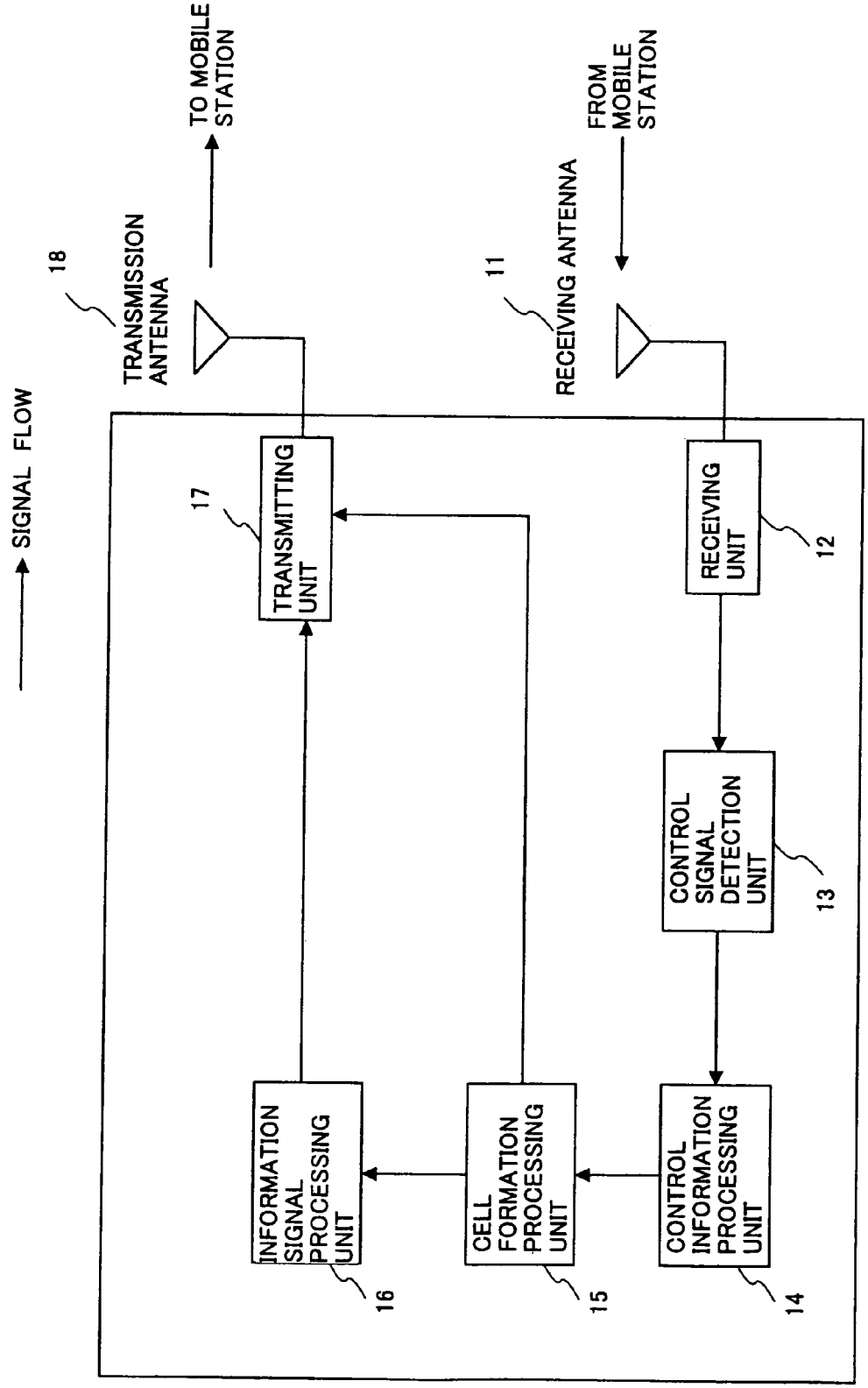
FIG. 2 is a figure showing a structure of a base station of the present invention.

The base station is structured as shown in FIG. 2, for example.

FIG. 2 is a block diagram of the base station of the present invention.

The base station includes a receiving antenna 11, a receiving unit 12, a control signal detection unit 13, a control information processing unit 14, a cell formation processing unit 15, an information signal processing unit 16, a transmitting unit 17, and a transmitting antenna 18.

In FIG. 2, an arrow shows a flow of a signal.

The receiving unit 12 receives a signal transmitted from the mobile station through the receiving antenna 11, and provides the received signal to the control signal detection unit 13 of the following stage. In the control signal detection unit 13, a change stop signal that is the control signal transmitted by the mobile station is detected from the signal received by the receiving unit 12, and information contained in the signal is provided to the control information processing unit 14 of the following stage. The control information processing unit 14 extracts and temporarily stores the information provided by the control signal detection unit 13. Here, since the change stop signal may be transmitted from two or more mobile stations, the information is stored with a mobile station identifier corresponding to each mobile station. Then, the control information processing unit 14 provides the cell formation processing unit 15 with the information including a value of the cell radius ($L_{MAX}$) that is to be used in the cell formation change. Details about $L_{MAX}$ will be described later. The cell formation processing unit 15 provides the information signal processing unit 16 with a new cell radius R1 that the cell formation change is to take. Further, the information signal processing unit 16 provides the new cell radius $R_1$ (changed cell radius) to the transmitting unit 17. However, at this juncture, in the case that $L_{MAX}$ is provided by the control information processing unit 14, $R_1$ is set with the value of $L_{MAX}$, and then, R1 is provided to the transmitting unit 17 through the information signal processing unit 16. The information signal processing unit 16 updates contents of an information signal, and provides it to the transmitting unit 17. The transmitting unit 17 transmits the updated information signal to all the mobile stations in the cell. Further, the transmitting unit 17 is equipped with a function, such as transmission power control, to change the cell radius to $R_1$.

On the other hand, if no change stop signals from the mobile stations are detected by the control signal detection unit 13, the cell formation processing unit 15 provides R1, with no regard to $L_{MAX}$, to the transmitting unit 17, and cell formation change is carried out in the transmitting unit 17.

Figure 3:
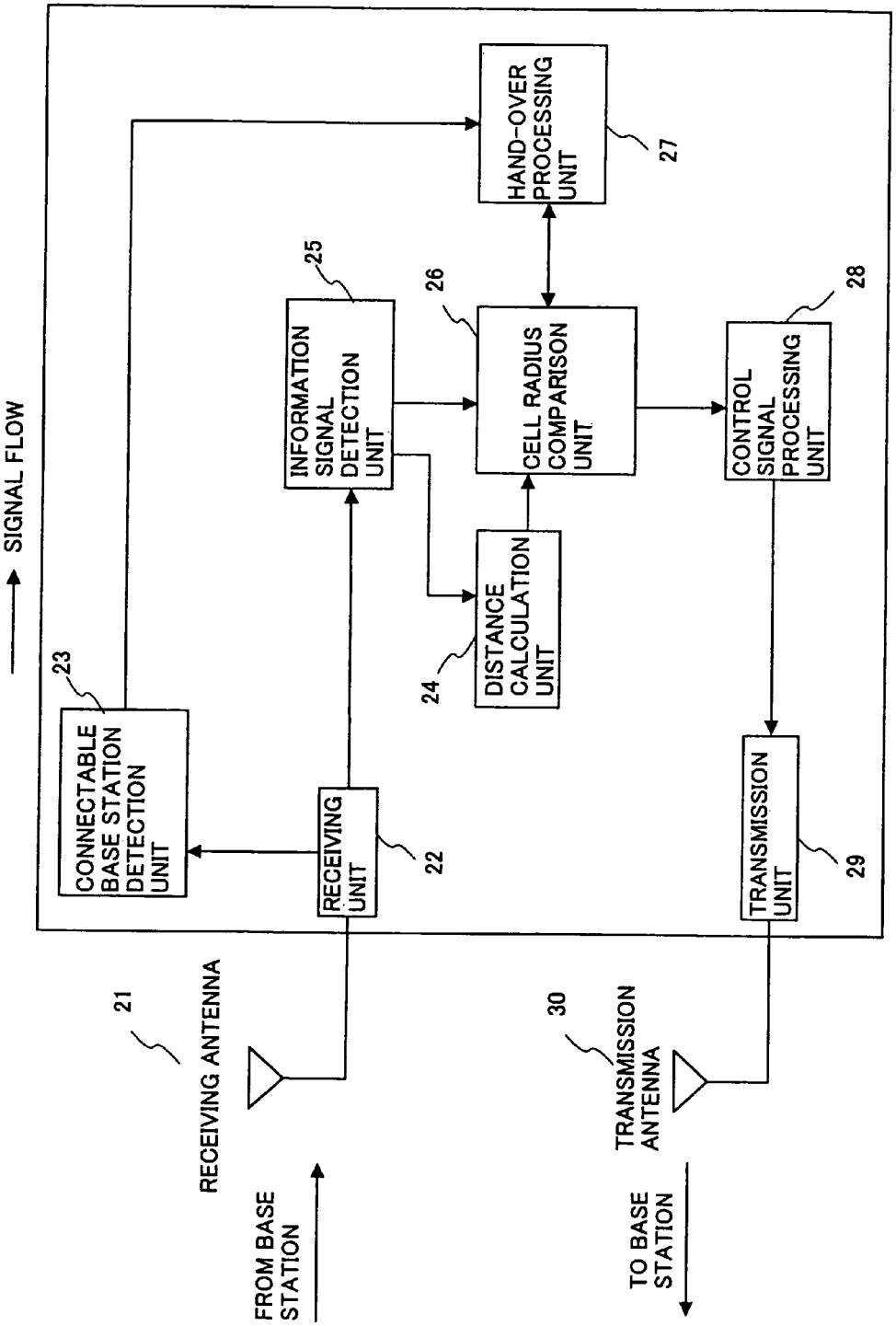
FIG. 3 is a figure showing a structure of a mobile station of the present invention.

The mobile station is structured as shown in FIG. 3, for example.

FIG. 3 is a block diagram of the mobile station of the present invention

The mobile station includes a receiving antenna 21, a receiving unit 22, a connectable base station detection unit 23, a distance calculation unit 24, an information signal detection unit 25, a cell radius comparison unit 26, a hand-over processing unit 27, a control signal processing unit 28, a transmitting unit 29, and a transmitting antenna 30. In FIG. 3, an arrow shows a flow of a signal.

The receiving unit 22 receives a signal transmitted from the base station through the receiving antenna 21, and an information signal contained in the received signal is provided to the information signal detection unit 25 and the connectable base station detection unit 23. In the connectable base station detection unit 23, information required to determine a hand-over destination, such as the number of base stations that can communicate with the mobile station, a base station identifier, a receiving level, and the like, is extracted from the information signal provided by the receiving unit 22, and the information is provided to the hand-over processing unit 27. The information in the hand-over processing unit 27 contains information about hand-over destination base station candidates when the cell radius comparison unit 26 requires a hand-over control.

In the information signal detection unit 25, the information about the cell radius is extracted from the information signal received from the receiving unit 22. The information here includes, for example, the received electric power $P_r$ of the signal, the new cell radius $R_1$ if the cell formation change actually takes place, and the present base station transmission electric power $P_s$, and the like. The value of the cell radius after change $R_1$ is provided to the cell radius comparison unit 26, and other values, such as a value of $P_s$, which are needed for calculating a distance (distance between the base station and the mobile station) are provided to the distance calculation unit 24.

The cell radius comparison unit 26 checks whether or not the mobile station will remain within the service area of the base station by comparing the new cell radius after change $R_1$ with the distance between the mobile station and the base station. If it is determined that the mobile station will become outside the service area if the cell radius is actually changed, a hand-over direction is provided to the hand-over processing unit 27 or a change stop direction is provided to the control signal processing unit 28, depending on whether another base station is available for hand-over. The control signal processing unit 28 generates either of the change stop signal or the control signal relative to hand-over, and the generated signal is transmitted from the transmitting unit 29.

Next, an outline of the first embodiment of cell radius change processing of the present invention is described with reference to FIG. 4.

Section (a) of FIG. 4 shows a mobile communications system referenced to explain the outline of the first embodiment. In this figure, mobile stations A and B are present in the service area ($R_0$=initial cell radius) that a base station forms, and each mobile station can communicate with the base station. The base station is to change the cell radius from the initial radius $R_0$ to a new cell radius $R_1$.

In FIG. 4, the distance between the base station and the mobile station A is expressed as $L_A$, and the distance between the base station and the mobile station B is expressed as $L_B$.

Section (b) of FIG. 4 shows an outline of the cell radius change processing that the base station performs when only one mobile station A is present in the cell radius $R_0$ of the base station in the mobile communications system of the section (a) of FIG. 4. Here, the horizontal axis of this graph expresses the time lapse starting when the base station proposes a new cell radius, and the vertical axis expresses the distance (cell radius) from the base station concerned.

In the section (b) of FIG. 4, at the time of t=0, the base station starts proposing to change the cell formation and provides information about the change to all the mobile stations in the cell as a part of the information signal. During a period between t=0 and t=T, the information signal is transmitted to the mobile stations, and the cell radius is made small at t=T. The cell radius after change is expressed by $R_1$. Here, it is assumed that the position of the mobile station A is not changed during the period. As the section (a) of FIG. 4 shows, the mobile station A is within the service area before and after the cell radius change. In this case, no special processing is necessary as to the mobile station A.

Section, (c) of FIG. 4 shows an outline of the cell radius change processing where only the mobile station B is present in the cell radius $R_0$ formed by the base station in the mobile communications system as shown by the section (a) of FIG. 4.

When the cell radius is made small as shown in the section (b) of FIG. 4, the mobile station B becomes outside of the service area after t=T at which time the cell radius is made small. However, in the present invention, the mobile station B is warned in advance of the cell radius change, that is, the mobile station B becoming outside the service area if the cell radius is actually made small according to the information signal received during the period between t=0 and t=T. Consequently, the mobile station B can attempt to hand-over the existing communication connection to another base station. The hand-over is performed if another base station is available, avoiding a disconnection. If the other base station is not available, the mobile station B transmits a change stop signal to the base station, such that the base station suspends the cell radius change, or revises the new cell radius such that the mobile station B can continuously be served.

Next, details of the processing procedure of the first embodiment are explained.

Figure 5:
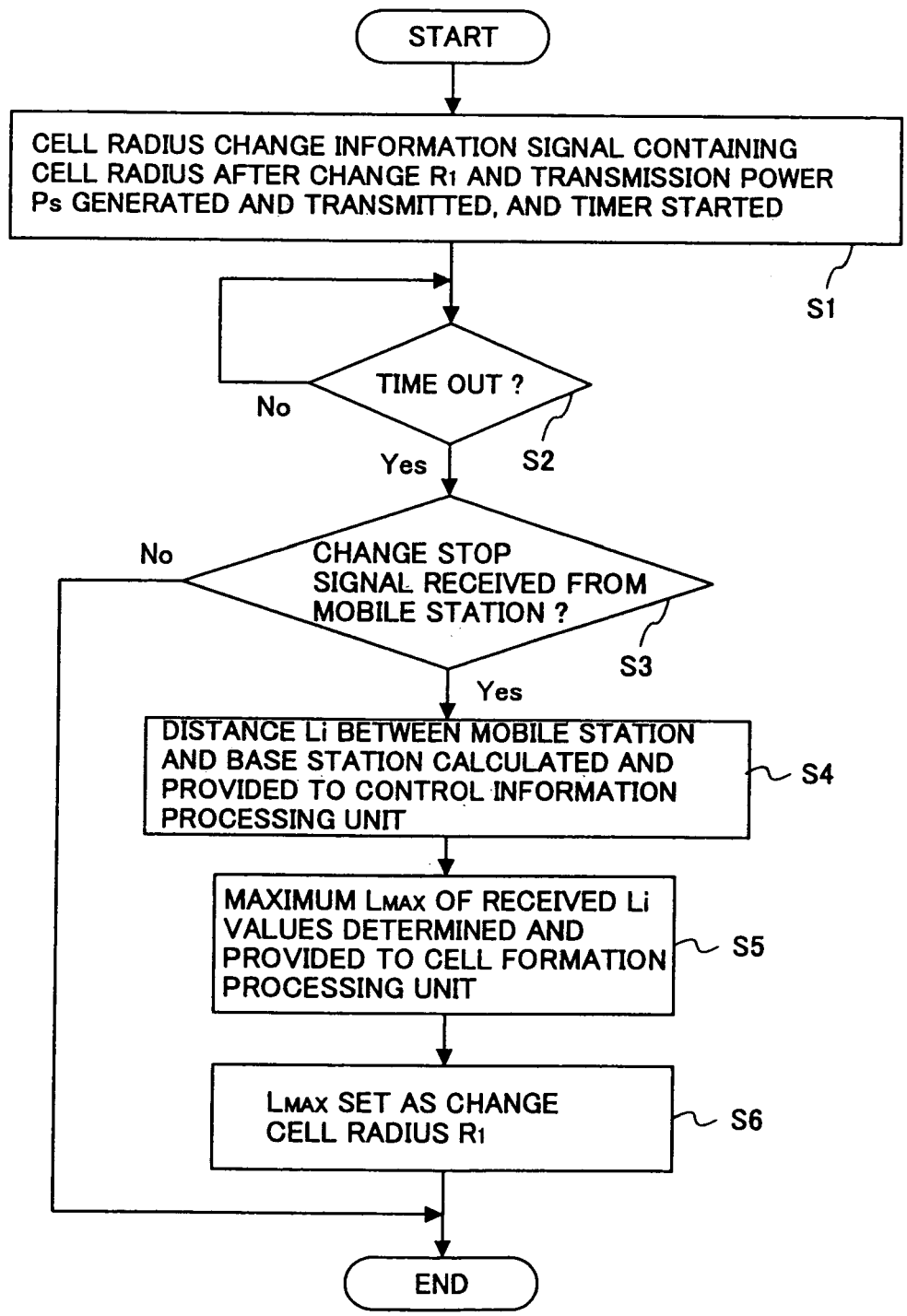
FIG. 5 is a flowchart showing steps of a process performed by a base station of the first embodiment.
Figure 6:
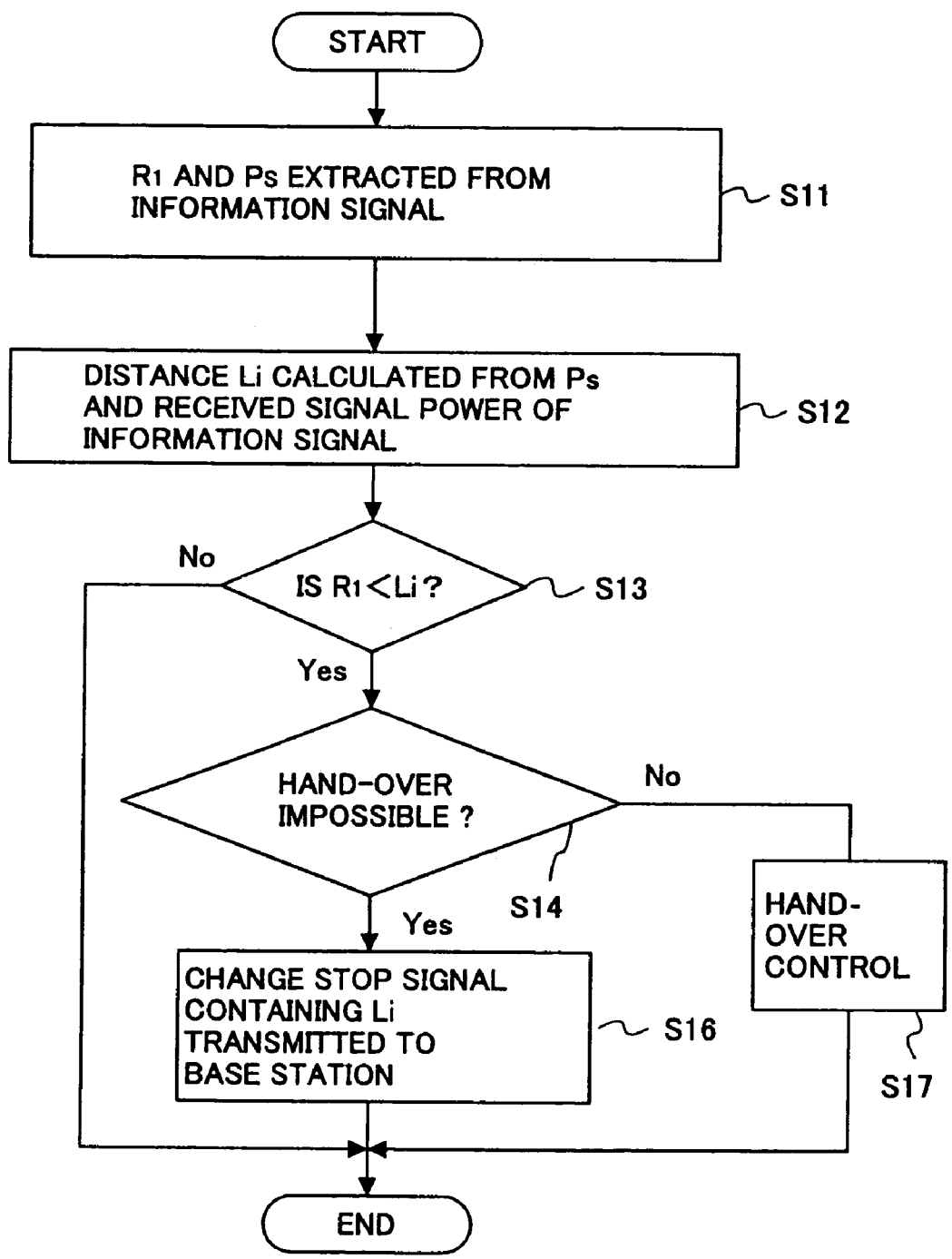
FIG. 6 is a flowchart showing steps of a process performed by a mobile station of the first embodiment.

FIG. 5 is a flowchart that shows the processing procedure of the base station, and FIG. 6 is a flowchart that shows the processing procedure of the mobile station.

First, the processing procedure of the base station is explained, referring to FIG. 5.

When the base station decides to make a cell radius change, the information signal processing unit 16 generates an information signal that includes information contents such as the new cell radius $R_1$ and the present transmission electric power $P_s$. The information signal is periodically and repeatedly transmitted (S1) to the mobile stations in the cell, a timer is started, and a response from the mobile station (S2) is waited for. The time length from the transmission start time of the information signal to scheduled time of the cell radius change implementation is set at T as shown in FIG. 4. When the predetermined time elapses, i.e., timeout, (YES at S2), the control signal detection unit 13 checks whether a change stop signal has been received from one or more of the mobile stations (S3). If the change stop signal has been received from one or more mobile stations (YES at S3), a value $L_i$ that indicates the distance between a mobile station and the base station is extracted from the change stop signal, and the value is provided to the control information processing unit 14 (S4).

Otherwise, that is, if it is determined that no change stop signals have been received from the mobile stations (NO at S3), the process ends, and returns to the first processing step.

The control information processing unit 14 determines the largest value $L_{MAX}$ of the distance values $L_i$ and the largest value $L_{MAX}$ is provided to the cell formation processing unit 15 (S5). The cell formation processing unit 15 sets the value $L_{MAX}$ as the value of the new cell radius $R_1$ such that the mobile station that gives the largest value can remain within the service area of the base station (S6). Then, the process ends, and returns to the first processing step, and repeats the above-mentioned procedure.

Next, the processing procedure of the mobile station is described with reference to FIG. 6. When the receiving unit 22 of the mobile station receives the information signal from the base station with which it is communicating, the received signal is provided to the information signal detection unit 25. The information signal detection unit 25 extracts data is such as the received electric power Pr, the new cell radius $R_1$ after change, and the present transmission electric power $P_s$ of the base station from the received signal (S11), and provides the data to the distance calculation unit 24. The distance calculation unit 24 calculates the distance $L_i$ between the mobile station and the base station concerned, applying the received electric power $P_r$ and $P_s$ received from the information signal detection unit 25 to a formula (Formula 1) that gives a relationship between the signal electric power and the distance (S12).

$$P_r = A \times P_s \times (1/L_i)^4, \text{ where} \qquad \text{(Formula 1)}$$

A is a coefficient indicative of the propagation path situation between the base station and the mobile station.

Although the present embodiment employs Formula 1, for example, for calculating the distance between the mobile station and the base station, another formula of the relationship between the signal electric power and the distance suitable for the propagation path characteristics of the system can be used, and the present invention is not limited to using Formula 1.

When the distance calculation unit 24 calculates $L_i$, the calculation result is provided to the cell radius comparison unit 26. The cell radius comparison unit 26 compares $L_i$ with $R_1$ (S13). If it is determined that $R_1$ is larger than $L_i$ (NO at S13), the process ends because it means that the mobile station will remain within the service area after the cell radius change. Otherwise, if it is determined that $R_1$ is smaller than $L_i$ (YES at S13), the process moves to the next step (S14) where it is determined whether a hand-over to another base station is possible (S14). The determination (S14) is performed as follows.

The hand-over processing unit 27 receives information items sent one by one from the connectable base station detection unit 23, and determines the availability of a hand-over. The result of the determination (availability of base stations for hand-over) is periodically provided to the cell radius comparison unit 26. The cell radius comparison unit 26 determines whether a hand-over to another base station is possible using the information about the availability of connectable base stations provided by the hand-over processing unit 27.

When the cell radius comparison unit 26 performs determining as mentioned above (S14) and determines that a hand-over to another base station is possible (NO at S14), it directs the control signal processing unit 28 to generate a control signal that is needed by the mobile station for carrying out hand-over. Then, the control signal is provided to the mobile station such that the mobile station carries out the hand-over to another base station, and continues communication.

Otherwise, that is, when it is determined that the hand-over to another base station is impossible (YES at S14), the transmitting unit 29 of the mobile station concerned transmits the change stop signal that contains $L_i$ to the base station (S16). According to this embodiment, a mobile station is capable of preventing the base station from reducing the cell radius any smaller than $L_i$ by transmitting information that contains the value of $L_i$ to the base station.

Next, an outline of the second embodiment of the cell radius change processing is described with reference to FIG. 7, wherein a base station changes cell formation based on the cell formation control method of the present invention.

Figure 7:
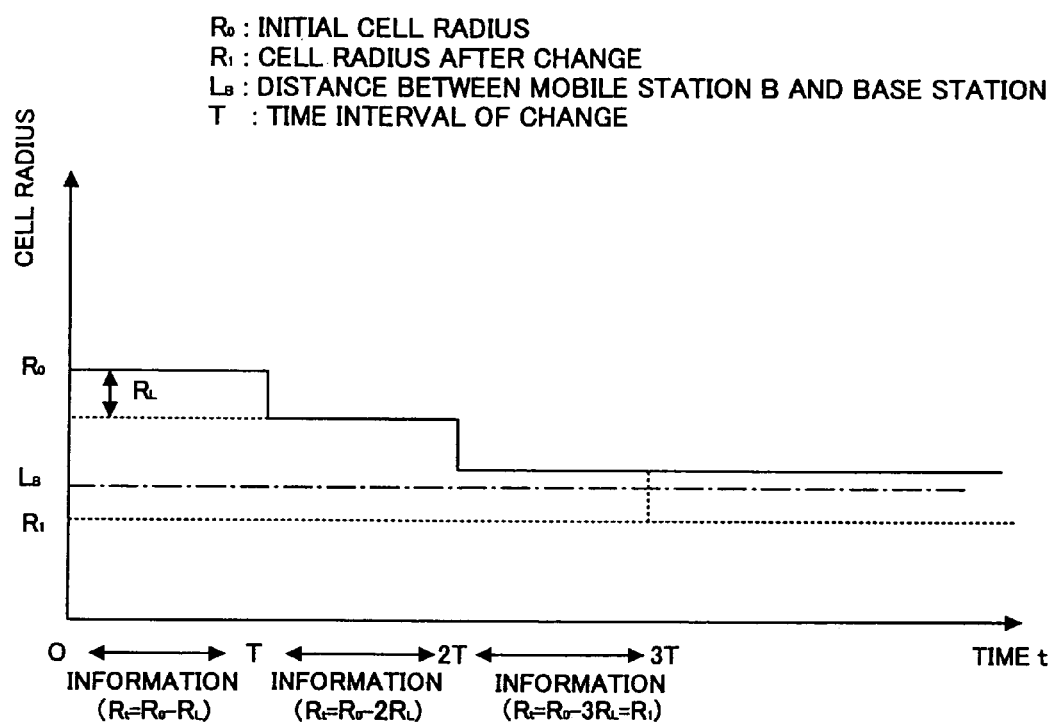
FIG. 7 is a figure showing an outline of a second embodiment of the cell radius change process.

In FIG. 7, the horizontal axis expresses the time lapse from the time when the base station decides to change the cell radius, and the vertical axis expresses the distance (cell radius) from the base station, like FIG. 4. Here, in the base station, $R_0$ represents the present cell radius, and $R_1$ represents the new cell radius after the change that the base station proposes to perform. In the second embodiment of the present invention, the cell radius change from $R_0$ to $R_1$ is performed in N steps, without changing all at once. For example, the cell radius change is carried out in three steps (N=3) in this embodiment, namely, the cell radius is to be reduced from $R_0$ to $R_t=R_0-R_L$, $R_t=R_0-2R_L$, and then to $R_t=R_0-3R_L=R_1$, as shown in this graph. Specifically, the following $R_t$ values of stage change cell radius are transmitted during each specified period. Namely, between t=0 and t=T, $R_t=R_0-R_L$, between t=T and t=2T, $R_t=R_0-2R_L$, and,
between t=2T and t=3T, $R_t=R_0-3R_L=R_1$ are provided to the mobile station as the new cell radius values to which a cell formation change is proposed. If the mobile station is located at a distance $L_B$, the radius changes proposed during t=0 and t=2T do not affect the mobile station, and no further action is necessary. However, the radius change proposed during t=2T and t=3T will make the mobile station become outside the service area. Therefore, the mobile station transmits the change stop signal to the base station such that the cell radius change that makes the mobile station outside the area is stopped.

Next, details of the processing procedure of the second embodiment are explained.

Figure 8:
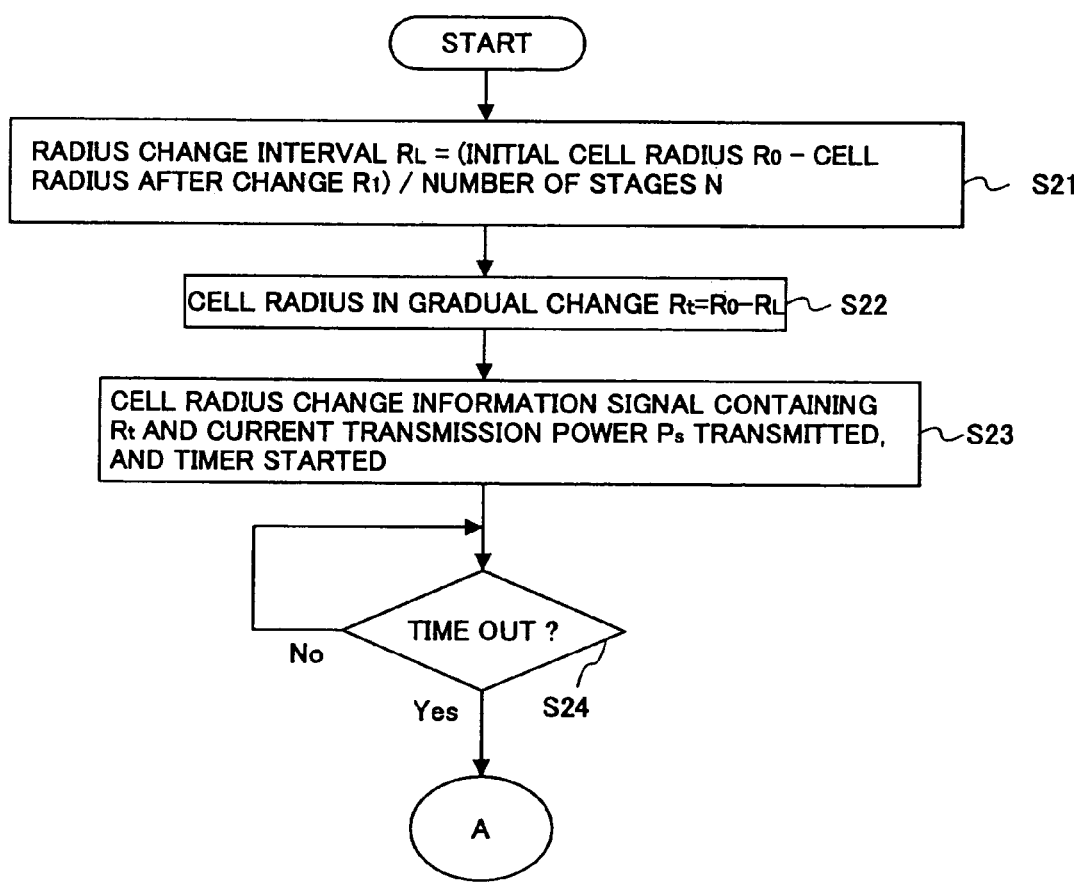
FIG. 8 is a flowchart showing steps of a process performed by a base station of the second embodiment.
Figure 9:
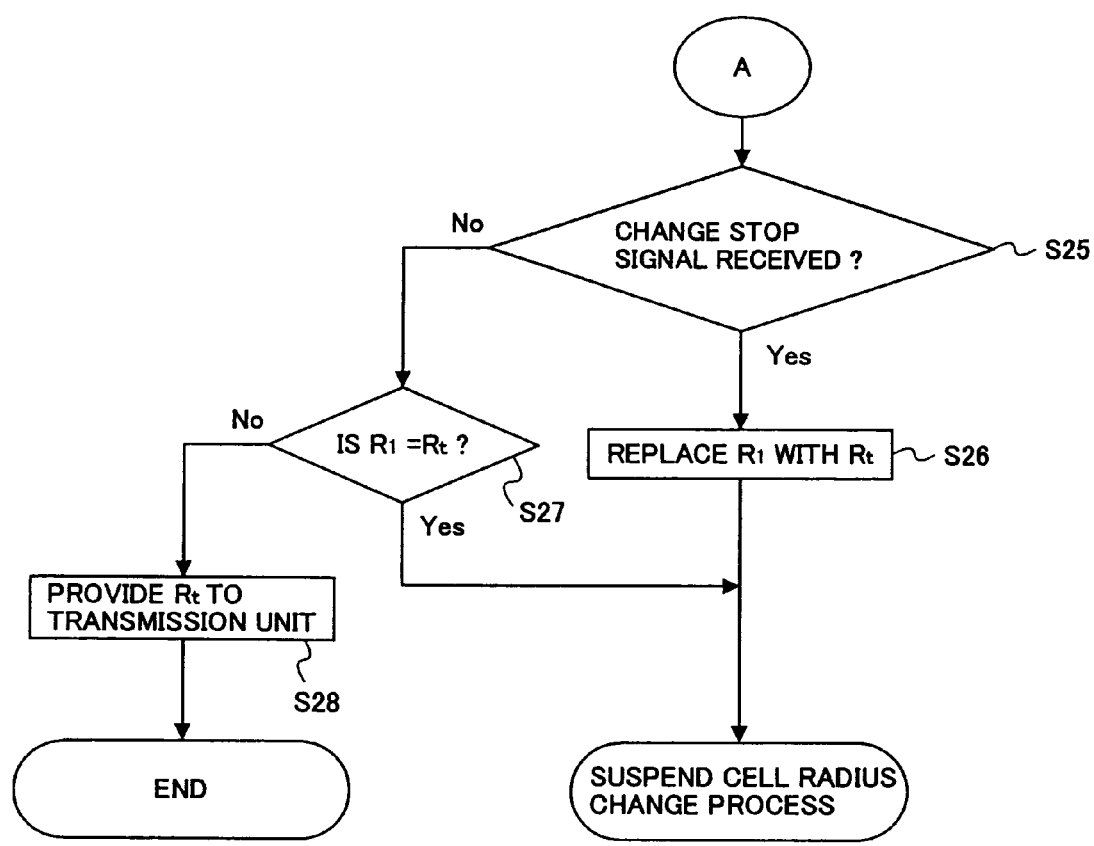
FIG. 9 is a flowchart showing a continuation of the steps of the process performed by the base station of the second embodiment (continuation of FIG. 8)
Figure 10:
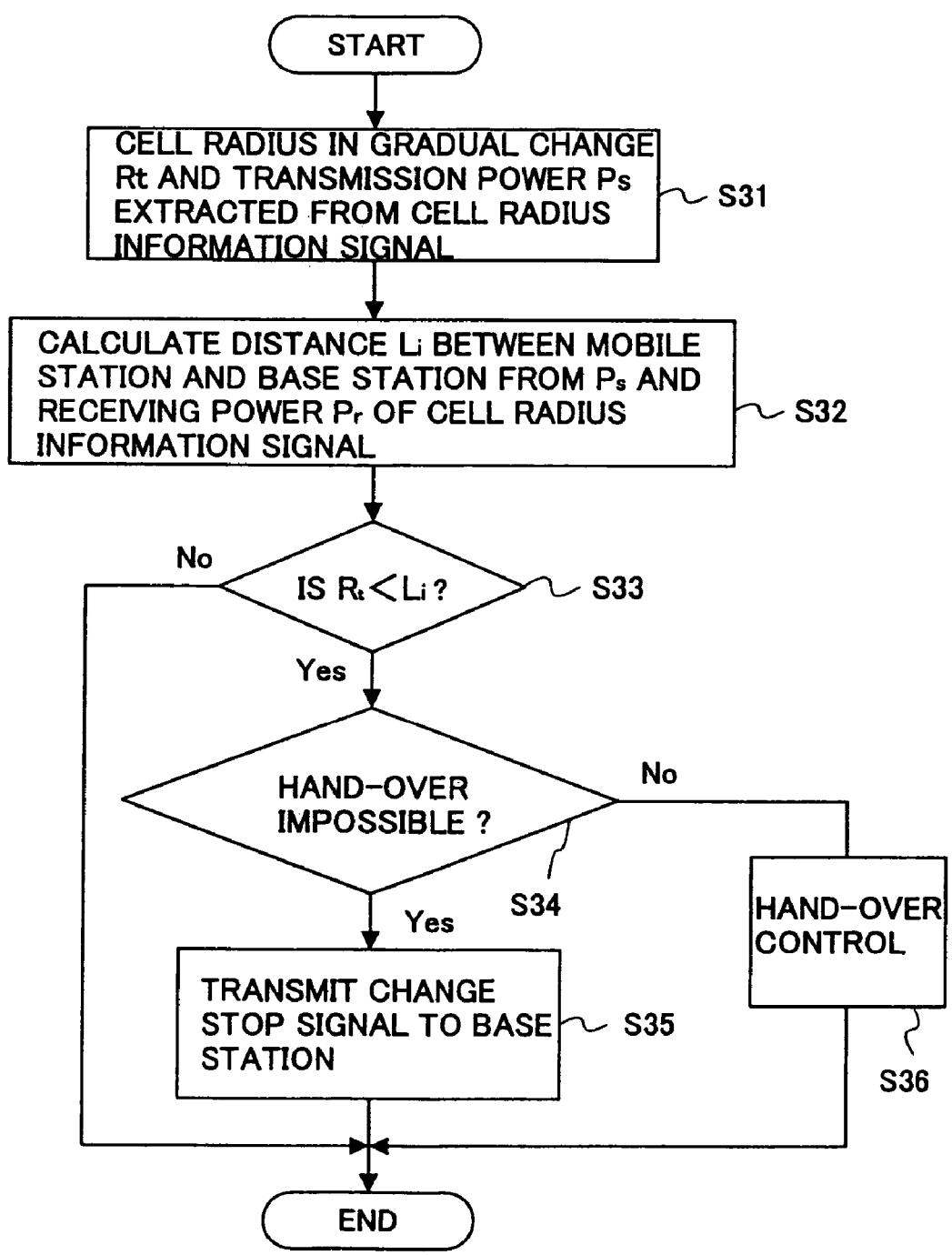
FIG. 10 is a flowchart showing steps of a process performed by a mobile station of the second embodiment.

FIGS. 8 and 9 are flowcharts showing the processing procedure of the base station, and FIG. 10 is a flowchart showing the processing procedure of the mobile station.

First, the processing procedure of the base station is explained, referring to FIG. 8 and FIG. 9.

When a cell radius change is decided upon by the base station, a radius decrement interval $R_L$ is obtained by dividing the difference between the new cell radius after change R1 and the present cell radius $R_0$ by the number of times N of change as indicated by the following formula (Formula 2) (S21).

$$R_L=(R_0-R_1)/N \quad \text{(Formula 2)}$$

Next, a radius $R_t$ that the base station changes to in steps is obtained by the following formula (Formula 3) (S22).

$$R_t=R_0-R_L \quad \text{(Formula 3)}$$

The above processes are performed by the cell formation processing unit 15. The resulting Rt is provided to the information signal processing unit 16. The information signal processing unit 16 generates an information signal including data of $R_t$ and the present transmission electric power PS, transmits the information signal to the mobile station in the cell periodically and repeatedly through the transmitting unit 17, operates a timer, and waits for responses from the mobile stations (S23). The time length from the transmission start time of the information signal to the scheduled implementation time of the cell radius change is set at T as shown in FIG. 7. After waiting for the response for the predetermined time, i.e., after a time out (YES at S24), the base station determines whether a change stop signal has been received from one or more mobile stations (S25). If a change stop signal has been received from one or more mobile stations (YES at S25), transmission of the contents of the proposed cell change is stopped, the value of the cell radius setting value set up in the cell formation processing unit 15 is deleted, and the cell radius change processing is stopped such that the mobile station that transmitted the change stop signal can remain in the service area. That is, if the new cell radius $R_1$ is set equal to $R_t$ (S26), the cell radius is made the smallest possible while keeping the mobile station within the service area.

On the other hand, if it is determined after the timeout (YES at S24) that no change stop signals have been received from any of the mobile stations (NO at S25), the process reached the final stage and is completed if $R_t=R_1$ (YES at S27). If $R_t$ is not equal to $R_1$ (NO at S27), $R_t$ is set at $R_t-RL$, and provided to the transmitting unit (S28), and the process returns to the first step.

Next, the processing procedure of the mobile station is described in reference to FIG. 10. The information signal from the base station with which communications are ongoing is received by the receiving unit 22 of the mobile station, and provided to the information signal detection unit 25 that extracts data such as the received electric power Pr, the cell radius Rt after change and the present transmission electric power PS of the base station included in the information signal (S31), and sends the data out to the distance calculation unit 24. The distance calculation unit 24 calculates the distance Li between the mobile station and the base station by applying the received electric power Pr and PS to the above-mentioned Formula 1 (S32).

In addition, although the present embodiment employs Formula 1, for example, for calculating the distance between the mobile station and the base station, another formula for the relationship between the signal electric power and the distance suitable for the propagation path characteristics of the system can be used, and the present invention is not limited to using Formula 1.

When the distance calculation unit 24 has calculated $L_i$ as mentioned above, the calculation result is provided to the cell radius comparison unit 26. The cell radius comparison unit 26 compares $R_t$ with $L_i$ (S33). If the comparison determines that $R_t$ is larger than $L_i$ (NO at S33), which indicates that the mobile station concerned will remain within the service area after the cell radius is changed, the process ends and returns to the first processing step.

Otherwise, if it is determined that $R_t$ is smaller than $L_i$ (YES at S33), the process moves to the next step, where it is determined whether a hand-over to another base stations is possible (S34). This determination (S34) is performed as follows.

The hand-over processing unit 27 receives the information items sent one by one from the connectable base station detection unit 23, and determines the availability of a connectable base station for hand-over from the received information. The result of the determination (the information about the availability of a connectable base station that is acquired as a determination result in this case) is periodically provided to the cell radius comparison unit 26. The cell radius comparison unit 26 determines whether the hand-over to another base station is possible using the information about the availability of a connectable base station provided by the hand-over processing unit 27.

The cell radius comparison unit 26 directs the control signal processing unit 28 to generate the control signal that is needed for the mobile station to carry out the hand-over, when it is determined that the hand-over to another base station is possible by the above-mentioned check (S34) (NO at S34). Using the control signal, the mobile station performs the hand-over to another base station, and continues communications.

Otherwise, when it is determined that the hand-over to another base station is impossible by the above-mentioned check (YES at S34), the mobile station concerned transmits a change stop signal to the base station (S35). Thereby, the mobile station can stop cell radius change processing of the base station, and can avoid disconnection of ongoing communications.

Next, an outline of the third embodiment of the cell radius change processing is described with reference to FIG. 11, wherein a base station changes cell formation based on the cell formation control method of the present invention.

Figure 11:
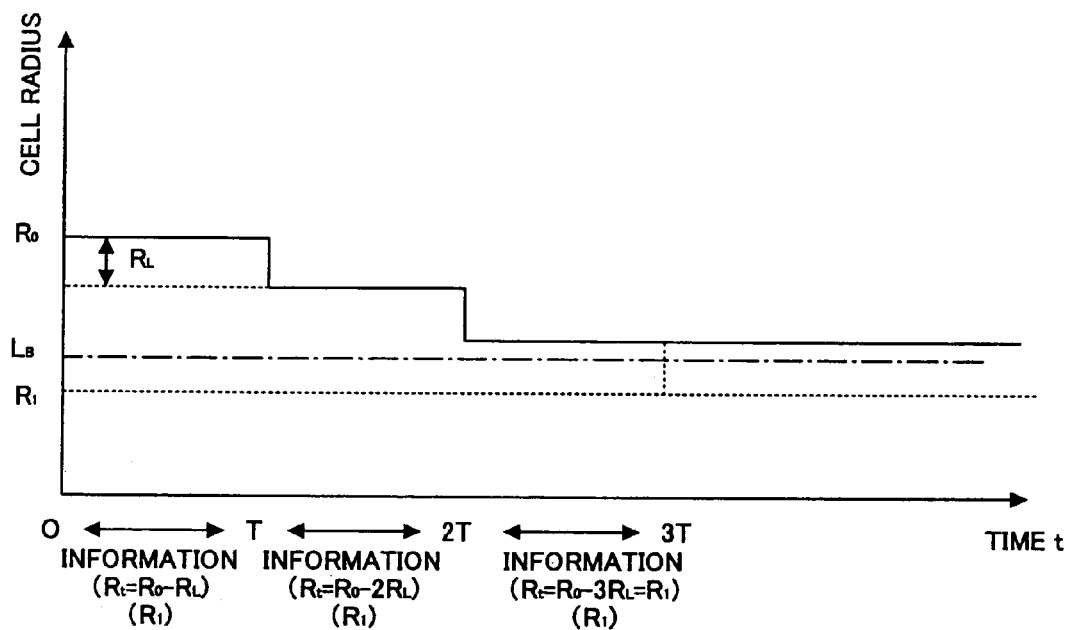
FIG. 11 is a figure showing an outline of a third embodiment of the cell radius change process.

As for FIG. 11, like FIG. 7, the horizontal axis expresses the time lapse from the time when the base station decides to make a cell radius change, and the vertical axis expresses the distance (cell radius) from the base station concerned. Here, in the base station cell, $R_0$ represents the present cell radius, and $R_1$ represents the new cell radius after change. In the third embodiment of the present invention, the cell radius change from $R_0$ to $R_1$ is divided in N stages. For example, the cell radius change is carried out in three steps (N=3) in this embodiment, namely, the cell radius is to be reduced from $R_0$ to $R_t = R_0 - R_L$, $R_t = R_0 - 2R_L$, and then to $R_t = R_0 - 3R_L = R_1$, as shown in this figure. Specifically, the following $R_t$ values of stage change cell radius are transmitted during each specified period. Namely, between t=0 and t=T, $R_t = R_0 - R_L$,
between t=T and t=2T, $R_t = R_0 - 2R_L$, and,
between t=2T and t=3T, $R_t = R_0 - 3R_L = R_1$ are provided to the mobile station as the new cell radius to which the cell formation is proposed to be changed.

In the third embodiment, information about the final cell radius $R_1$ is added to the information signal in each stage, which is in addition to the second embodiment.

In this example, if the distance between the mobile station and the base station is $L_B$, the cell radius change proposed during t=0–2T is acceptable, and no special process is needed. However, in the third embodiment, the final cell radius $R_1$ that the base station will ultimately propose is also provided from the beginning of t=0 to the mobile station. Therefore, the mobile station can start attempting to find another base station, a second base station, for hand-over at an earlier stage. Further, even when the second base station is in the process of changing its cell radius, the mobile station can determine whether the final cell radius $R_1$ of the second base station will contain the mobile station. In this manner, the number of times of hand-over can be decreased. Further, even when there is no candidate base station to which the distance from the mobile station is shorter than the final cell radius of the base station, it is possible to choose a base station for hand-over, with which communication can be maintained for the longest possible time, based on $R_1$ and the stage change cell radius $R_t$. Consequently, since the number of times of hand-over can be minimized, and transmission and reception of control signals, such as a change stop signal, can be minimized, wireless resources can be used efficiently.

Next, the detailed processing procedure of the third embodiment is explained.

Figure 12:
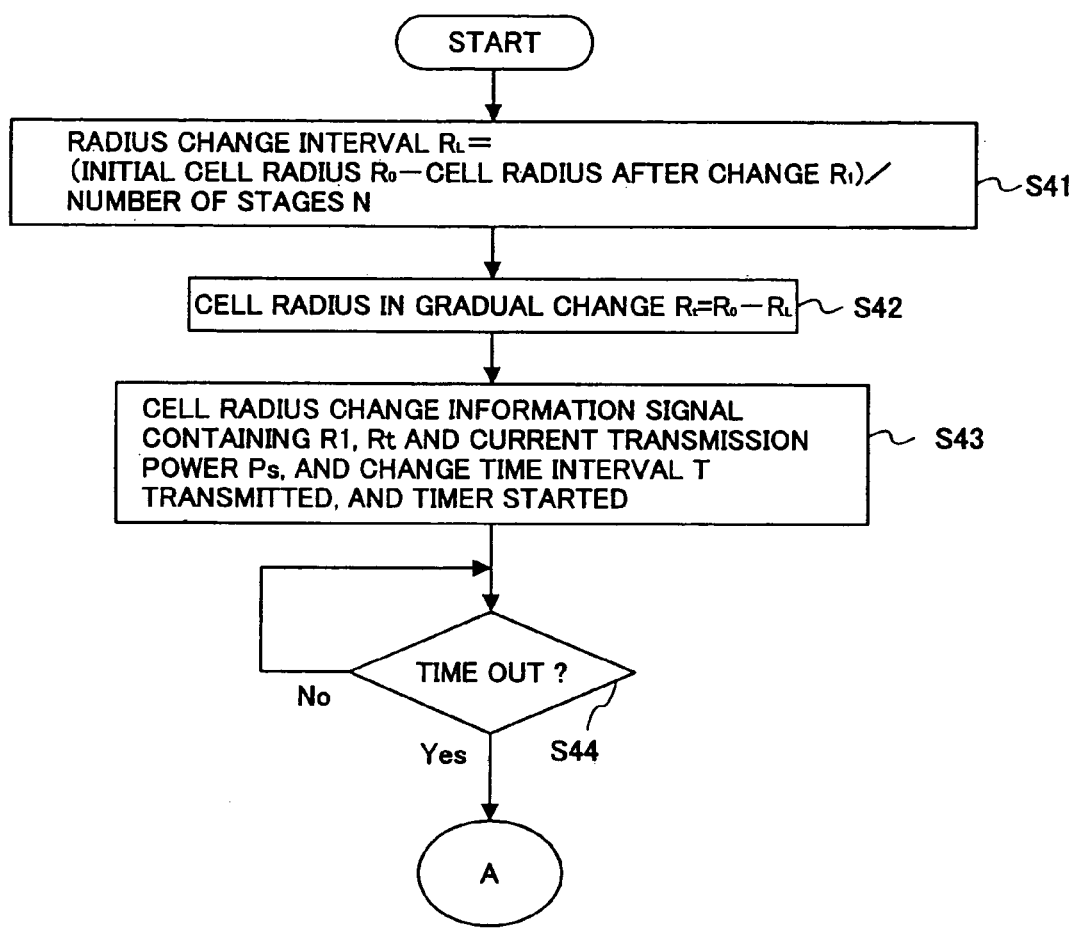
FIG. 12 is a flowchart showing steps of a process performed by the base station of the third embodiment.
Figure 13:
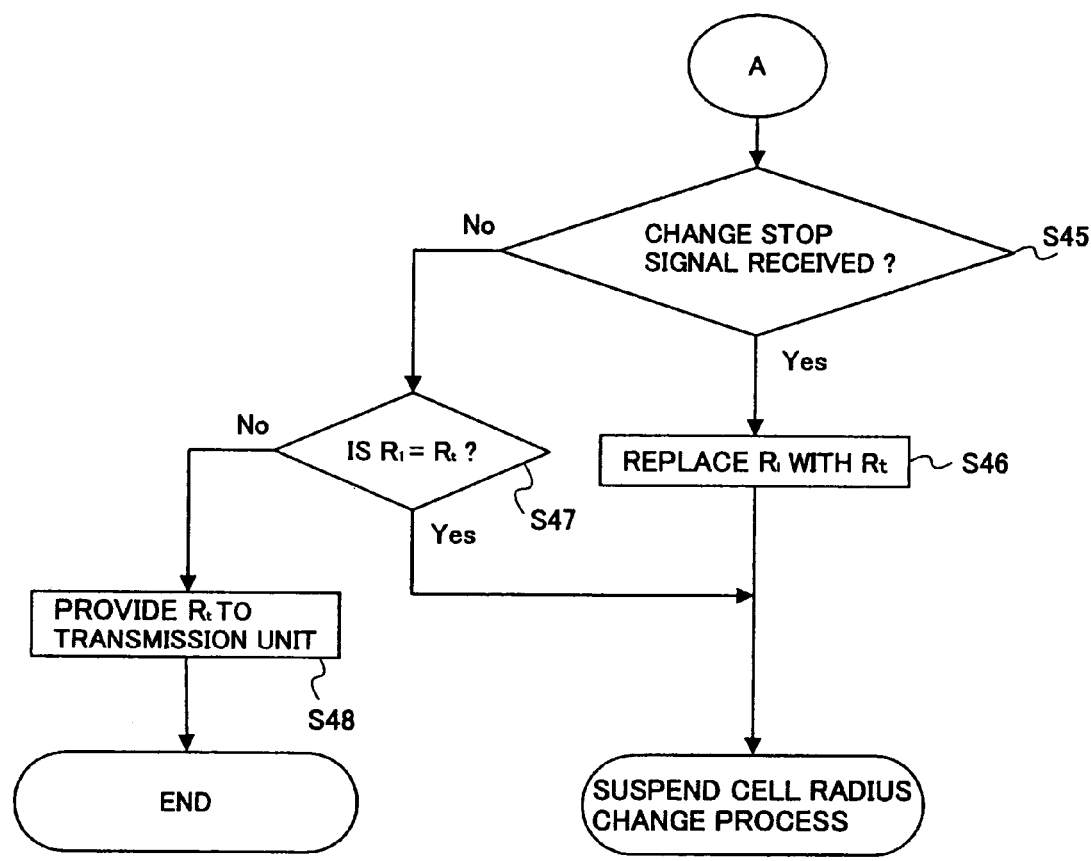
FIG. 13 is a flowchart showing a continuation of the steps of the process performed by the base station of the third embodiment (continuation of FIG. 12)
Figure 14:
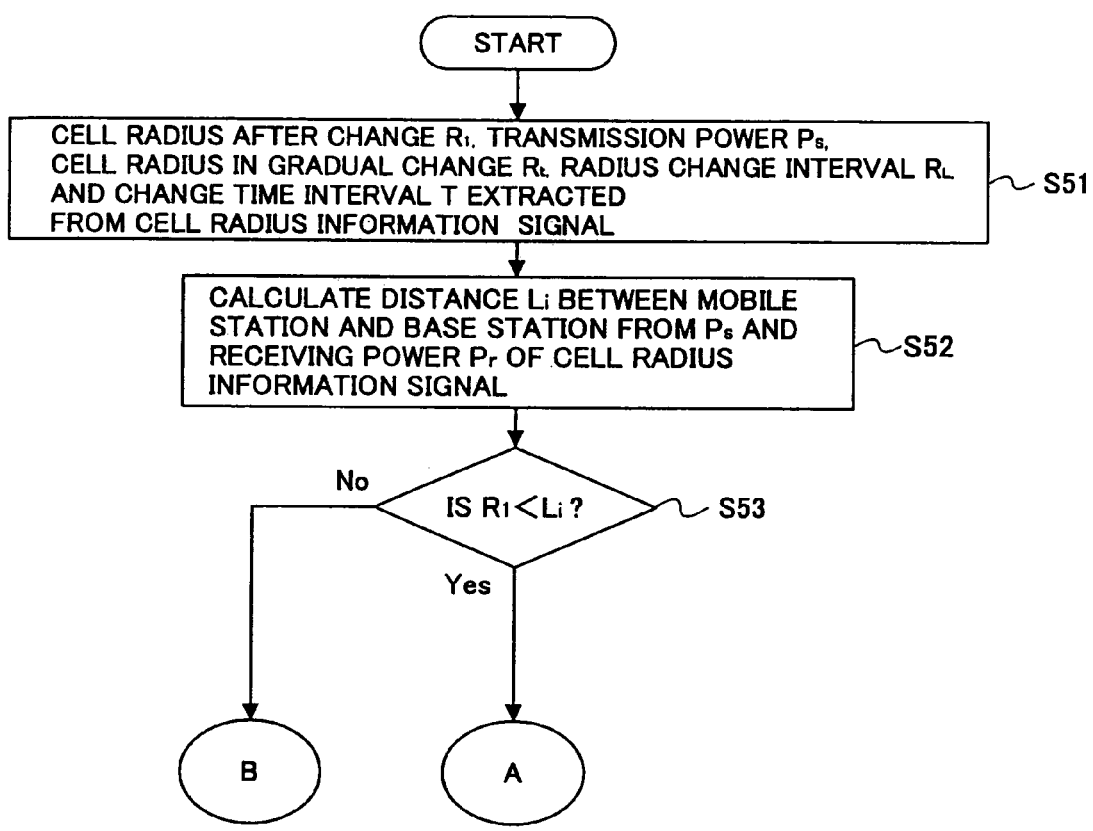
FIG. 14 is a flowchart showing steps of a process performed by the mobile station of the third embodiment.
Figure 15:
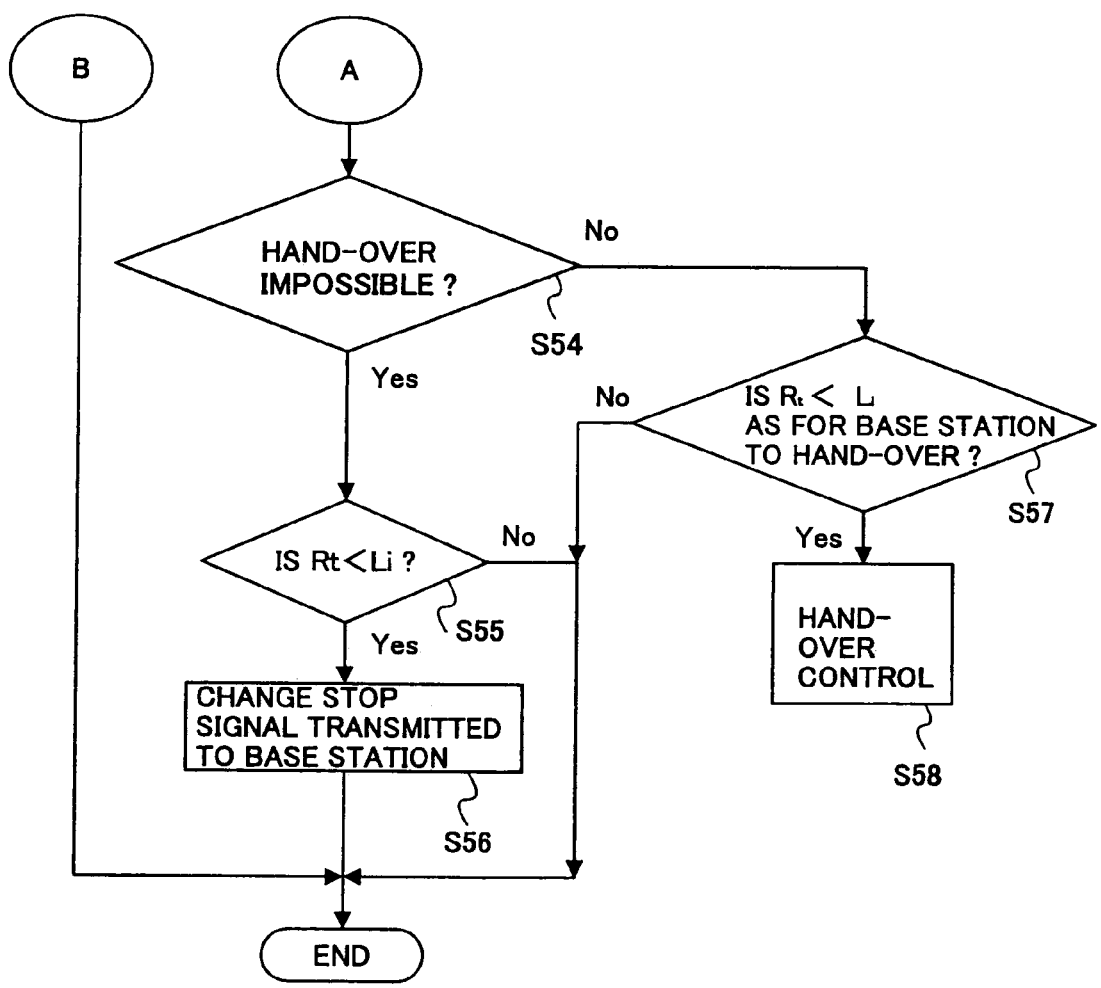
FIG. 15 is a flowchart showing a continuation of the steps of the process performed by the mobile station of the third embodiment (continuation of FIG. 14)
Figure 16:
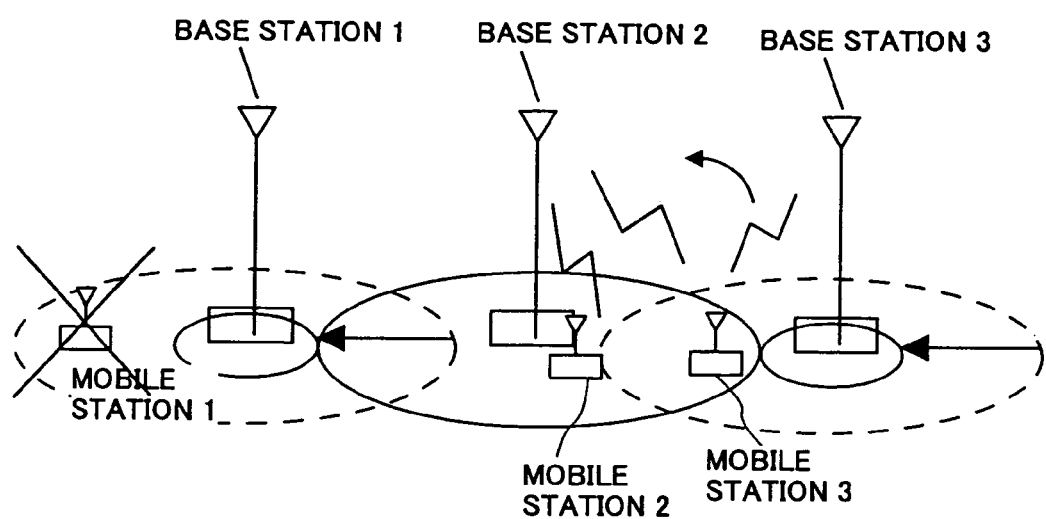
FIG. 16 is a figure explaining a conventional technology.

FIG. 12 and FIG. 13 are flowcharts showing the processing procedure of the base station, and FIG. 14 and FIG. 15 are flowcharts showing the processing procedure of the mobile station. First, the processing procedure of the base station is explained, referring to FIG. 12 and FIG. 13.

When the base station decides to make a cell radius change, a radius decrement interval $R_L$ of the cell radius is obtained by dividing the difference between the present cell radius $R_0$ and the final cell radius after change $R_1$ by the number of times of change N (refer to Formula 2) (S41). Next, the base station obtains Rt from the difference between $R_0$ and $R_L$, using Formula 3 (S42), $R_t$ being the stage change cell radius that the base station uses when gradually changing the cell radius. The processes are performed by the cell formation processing unit 15. The information signal processing unit 16 generates information containing data such as $R_1$, $R_t$, $P_s$, $R_L$, and T, and transmits the information to mobile stations in its cell periodically and repeatedly through the transmitting unit 17, operates a timer, and waits for responses from the mobile stations (S43). The time length from the time when transmission of the information signal is started to the scheduled time of cell radius change implementation is set at T as shown in FIG. 11. After waiting for the responses for the predetermined time, that is, after a timeout (YES at S44), it is determined whether a change stop signal is received from one or more mobile stations (S45). If it is determined that a change stop signal is received from one or more mobile stations (YES at S45), transmission of the information of the proposed cell change is stopped, the value of the cell radius set in the cell formation processing unit 15 is deleted, and the cell radius change processing is stopped, such that the mobile station that transmitted the change stop signal can remain in the service area. By replacing $R_1$ with $R_t$ (S46), the cell radius is set at the smallest possible while keeping the mobile station in question within the service area.

Otherwise, if it is determined after the timeout (YES at S44) that no change stop signals are received from any of the mobile stations (NO at S45), the process reaches the final step and is completed if $R_t = R_1$ (YES at S47). If $R_t$ is not equal to $R_1$ (NO at S47), $R_t$ is replaced with $R_t - R_L$, which is provided to the transmitting unit 17 (S48), and the process returns to the first step.

Next, the processing procedure of the mobile station is explained with reference to FIG. 14 and FIG. 15.

The processing procedure of the mobile station in the third embodiment is similar to the processing procedure of the second embodiment, as shown in this figure. However, the mobile station in the third embodiment is capable of selecting: a base station that can continue connection longer than others as the hand-over destination. That is, the mobile station can receive the information signal from a candidate base station, and calculate remaining time until the cell radius of the candidate base station reaches $R_1$, using $R_t$, $R_1$, $R_L$, and T contained in the information signal. In this manner, the mobile station can attempt to hand-over to the candidate base station before the mobile station becomes outside the service area of the candidate base station.

Further, the mobile station is capable of calculating the distance to the candidate base station from $P_s$ and the receiving signal level of the information signal from the candidate base station. By comparing the calculation result with $R_1$, the mobile station can determine whether the mobile station will remain within the service area after the cell radius change. Using this information, the mobile station can select a base station to communicate with such that the number of times of hand-over is minimized.

Although the embodiments described above are based on the base station autonomously controlling the cell formation, the present invention is applicable to a structure wherein a central station that governs a plurality of base stations controls the cell formation. In such a structure, the cell formation control is based on information acquired from the base stations governed by the central station. The central station may be, for example, a wireless circuit control station.

In the embodiments, the cell formation control function of the cell formation processing unit 15 of the base station includes a cell formation change stop means, a cell formation change means, and a cell radius gradual change means, and the information function of the information signal processing unit 16 includes a first cell information providing means and a second cell information providing means.

Further, the comparison function of the cell radius comparison unit 26 of the mobile station represents a preparatory outside-the-cell detection means, the signal transmitting function of the transmitting unit 29 represents a detection result providing means and a distance information providing means, the distance calculation function of the distance calculation unit 24 represents a distance calculation means, and the hand-over processing function of the hand-over processing unit 27 represents a first hand-over means and a second hand-over means.

As mentioned above, the cell formation control method and the mobile communications system of the present invention can prevent a disconnection of communication that is due to a reduced cell radius excluding a mobile station in communication from occurring by the mobile station being capable of informing the base station whether a planned cell radius reduction is acceptable, and by the base station reducing the cell radius enough to cover the mobile station based on the information from the mobile station.

The present invention further realizes a base station that can change cell formation according to the above cell formation control method.

The present invention further realizes a mobile station that can maintain communication without being disconnected, according to the above cell formation control method.

Further, the present invention is not limited to these embodiments, but various variations and modifications may be made without departing from the scope of the present invention.

What is claimed is:

1. A mobile communications system configured by two or more mobile stations and a base station that controls formation of a cell, comprising:

preparatory outside-the-cell detection means that enables each of the mobile stations to determine whether the mobile station will be placed outside the cell if a cell formation change is performed, in advance of the base station performing the cell formation change, based on information relative to the cell formation change provided to the mobile station by the base station, detection result providing means that enables the mobile station to provide a result of the preparatory outside-the-cell detection to the base station, and cell formation change stop means that enables the base station to suspend the cell formation change based on the result of the determination provided by the mobile station.

2. The mobile communications system as claimed in claim 1, further comprising:

distance calculation means that enables the mobile station to calculate a distance between the mobile station and the base station, when the mobile station determines that the mobile station will be outside the cell, distance information providing means that enables the mobile station to provide the calculation result as distance information to the base station, and cell formation change means that enables the base station to perform the cell formation change based on the distance information provided by the mobile station.

3. The mobile communications system as claimed in claim 1, further comprising first hand-over means that enables the mobile station to attempt a communication connection change to another base station when the mobile station determines that the mobile station will be placed outside the cell.

4. The mobile communications system as claimed in claim 1, further comprising first cell information providing means that enables the base station to provide all the mobile stations in the cell with the information relative to the cell formation change at a predetermined interval within a predetermined period, in advance of the cell formation change being performed.

5. A mobile communications system configured by two or more mobile stations and a base station that controls formation of a cell, comprising:

cell radius gradual change means that enables the base station to perform the cell formation change in two or more stages, including a final stage, at a predetermined interval, and a hand-over means for enabling the mobile station to attempt a communication connection change to another base station, when the mobile station determines that the mobile station will be placed outside the cell if the cell formation change is performed through the final stage, even if the mobile station will remain within the cell in any of prior stages.

6. The mobile communications system as claimed in claim 5, further comprising first cell information providing means that enables the base station to provide at a predetermined interval within a predetermined period all the mobile stations in the cell with the information relative to the cell formation change, in advance of the cell formation change being performed.

7. The mobile communications system as claimed in claim 6, further comprising second cell information providing means that enables the base station to provide at a predetermined interval within a predetermined period all the mobile stations in the cell with the information relative to the cell formation change, in advance of the cell formation change being performed, where the information relative to the cell formation change contains information about a cell radius of a next stage and a cell radius of the final stage.

8. A mobile station in a cell, which communicates with a base station, comprising a hand-over means for enabling the mobile station to attempt a communication connection change to another base station, when the mobile station determines from information relative to a cell formation change provided to the mobile station by the base station, that the mobile station will be placed outside the cell if the base station performs the cell formation change through a final stage, even if the mobile station will remain within the cell in any of prior stages.

* * * * *